Figure 2:
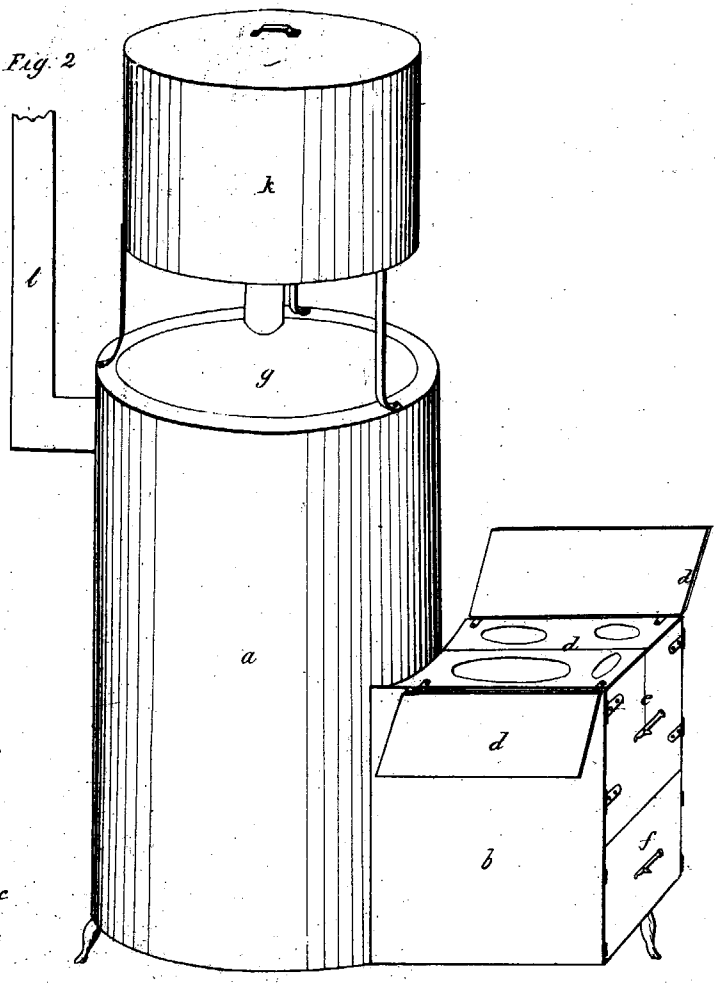
Figure 1:
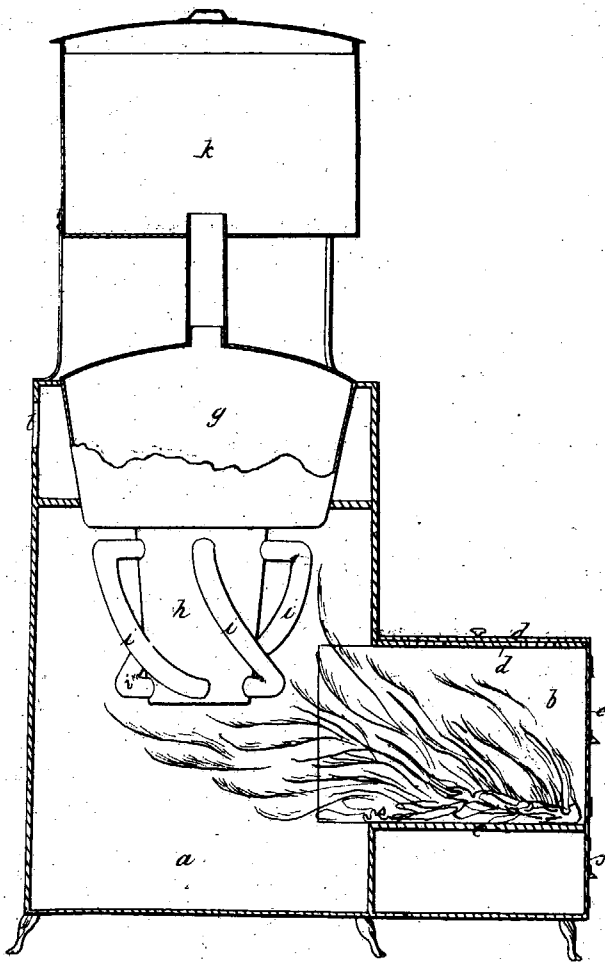

1622X

PATENTED DEC. 3, 1911.

J. TRUMAN.

PORTABLE KITCHEN OR CABOOSE.

[illegible]

Letters Patent

The schedule referred to in these Letters Patent and making part of the same containing a description in the words of the said James [illegible] himself of his Portable Kitchen or Stove Caboose. . . —

The furnace is a cylinder of 18 inches in diameter and 32 inches in height with a bottom, and fixed on 3 legs rivited to the sides. In the in side of the cylinder there are large wires, to prevent the boiler from being too near the sides, which would stop the ascension of the smoke. The front and lower part of the cylinder projects out from 10 to 12 inches, and is made flat which forms the fire and ash pit doors, the fire place is furnished with a grate for the fuel to lie on the top.

The projection has two double doors, the under ones with circular or oval holes in them for the admitting, [illegible], or when the doors are thrown up a frying pan or stew pan will fit the place, and when not in such use, to be shut down. The said projection rises as high as the top of the fire door, and a vent for the smoke left through a pipe within two inches of the top of the cylinder on the opposite side.—

The boiler is a vessel made to fit the furnace or cylinder, at top nearly and narrowing to the bottom, being about sixteen inches in diameter at top and 12 inches at the bottom.

There is a recess about 6 inches long (or more) by 5 inches at top and narrowing at the bottom to three inches or more, which is fixed in the bottom of the boiler so as to be on a level with the top of the fire door, with pipes projecting therefrom, being 5 inches in heighth by one half inch thick in the clear. These pipes are fixed in a vertical position, and the length of them so as not to project beyond the edge, or sides of the bottom of the boiler, which prevents its [illegible] down the furnace or cylinder with ease. There may be [illegible] pipes, [illegible] necessary to expedite the [illegible]

[illegible] and

[illegible]